(No Model.)
F. O. WILLIAMS.
CULTIVATOR.
No. 252,163. Patented Jan. 10, 1882.
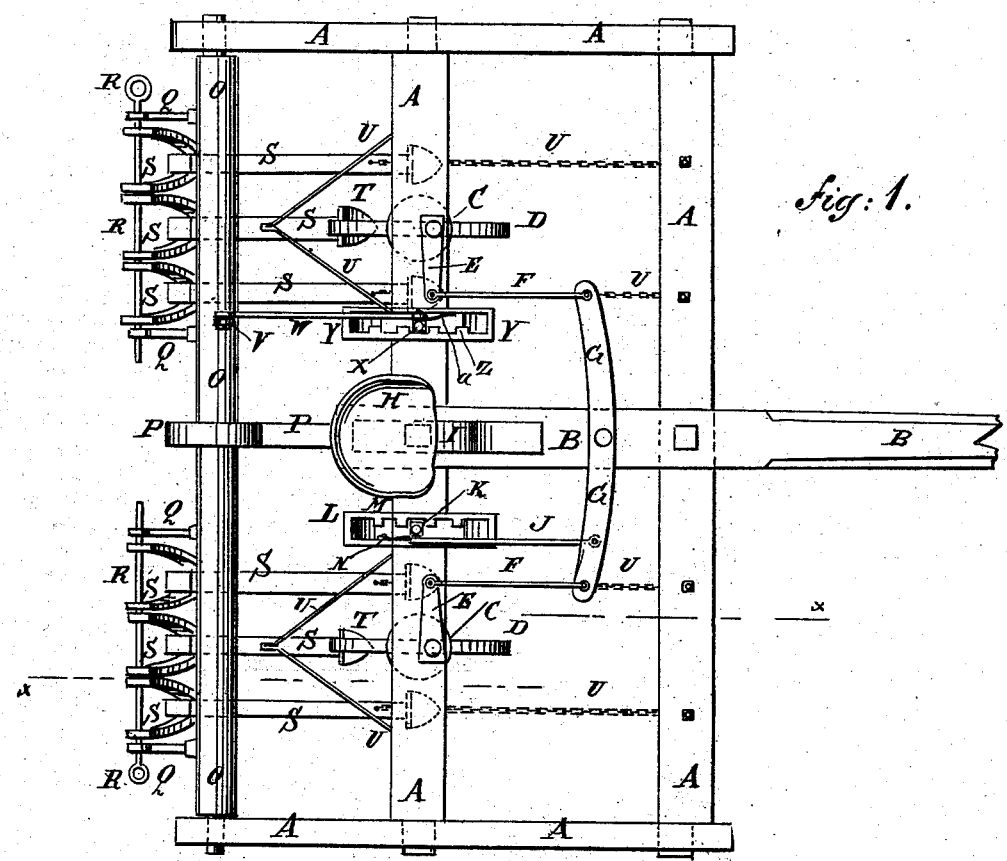
Fig: 1.
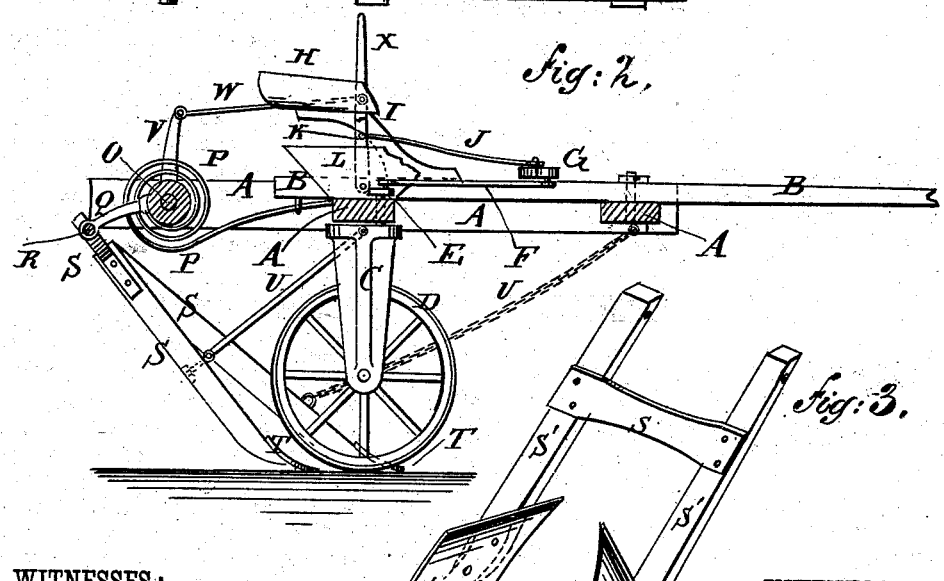
Fig: 2.
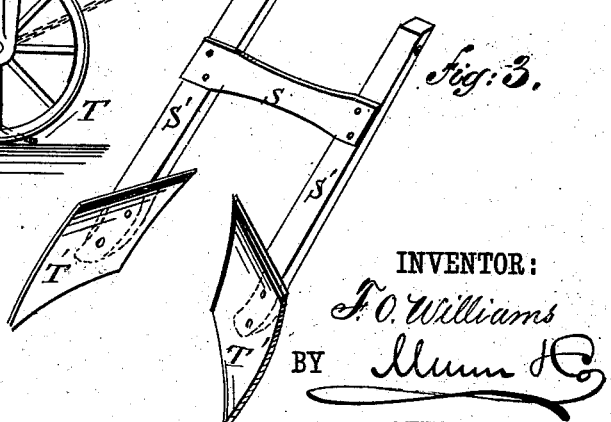
Fig: 3.
WITNESSES:
Chas. Nida
C. Sedgwick
INVENTOR:
F. O. Williams
BY Munn & Co.
ATTORNEYS.
N. PETERS, Photo-Lithographer, Washington, D. C.

UNITED STATES PATENT OFFICE.

FRANCIS O. WILLIAMS, OF NORTH COHOCTON, NEW YORK.

CULTIVATOR.

SPECIFICATION forming part of Letters Patent No. 252,163, dated January 10, 1882.

Application filed August 26, 1881. (No model.)

*To all whom it may concern:*

Be it known that I, FRANCIS O. WILLIAMS, of North Cohocton, in the county of Steuben and State of New York, have invented a new and useful Improvement in Cultivators, of which the following is a full, clear, and exact description.

In the accompanying drawings, Figure 1 is a plan view of my improvement. Fig. 2 is a sectional elevation of the same, taken through the line $x\,x$, Fig. 1. Fig. 3 is a perspective view of a pair of covering-plows and their standards.

Similar letters of reference indicate corresponding parts.

The object of this invention is to facilitate the preparation of ground to receive seed and the cultivation of plants.

A represents the frame of the machine, to the centers of the cross-bars of which is attached the tongue B.

To the central cross-bar of the frame A, about midway between its center and ends, are swiveled the upper ends of the standards C, to the slotted lower ends of which are pivoted the wheels D, so that the machine can be guided by turning the said standards and wheels.

With the upper ends of the standards C are rigidly connected the ends of the arms E, to the other ends of which are pivoted the rear ends of the connecting-rods F. The forward ends of the connecting-rods F are pivoted to the ends of the lever G, which is pivoted at its center to the tongue B in such a position that the said lever will serve as a foot-rest for the driver, so that the driver with his feet can operate the lever G to turn the standards C and wheels D, and thus guide the machine.

H is the driver's seat, the standard I of which is attached to the rear part of the tongue B in such a position that the driver's weight will balance the machine.

To the foot-lever G, near one end, is pivoted the forward end of the connecting-rod J, the rear end of which is pivoted to a lever, K. The lower end of the lever K is pivoted in and to the lower part of a narrow hopper-shaped box, L, and its upper end projects into such a position that it can be readily reached and operated by the driver from his seat. The lever K moves along a rack-bar, M, formed upon or attached to the edge of one side of the box L. The other side of the box L serves as a guard to keep the lever K in place. The lever K is held in contact with the rack-bar M by a spring, N, interposed between the said lever K and the side of the box L. With this construction the wheels can be locked in any position into which they may be adjusted, and the said wheels can also be adjusted by operating the lever K.

To the rear ends of the side bars of the frame A are pivoted the ends of a shaft, O. Around the shaft O are coiled one or more springs, P, the inner ends of which are attached to the said shaft. The outer ends of the springs P are attached to the tongue B or some convenient part of the frame A.

To the shaft O are attached rearwardly-projecting arms Q, the outer ends of which are perforated to receive the rods or long bolts R. The rods R also pass through holes in the forked upper ends of the standards S, to the lower ends of which are attached the plows T. The draft-strain upon the standards S is sustained by the rods or chains U, the rear ends of which are attached to the said standards S, and their forward ends are attached to the cross-bars of the frame A. With this construction, by making the draft-connection U wholly or in part of links they can be readily lengthened and shortened to regulate the pitch of the plows.

To the shaft O is attached an upwardly-projecting arm, V, to the upper end of which is attached the rear end of a rod or chain, W. The forward end of the rod or chain W is attached to the lever X, the lower end of which is pivoted in and to the lower part of the narrow hopper-shaped box Y, attached to the frame A.

Along one edge of the box Y is formed, or to it is attached, a rack or catch bar, Z, with the teeth of which the lever X engages, so as to be held securely in any position into which it may be adjusted. The lever X is held against the catch-bar Z by a spring, $a$, interposed between the said lever and the side of the said box. With this construction, by operating the lever X the shaft O can be turned to raise the standards S and plows T away from the ground when desired. The plows are held down to their work by the tension of the spring P. When the connection W is a rod the lever X can be used for holding the plows down to their work in plowing hard ground. With this construction, when either of the plows T strikes an obstruction, the lever X being free, the backward pressure against the said plow will turn the shaft O, and thus allow the said plow to rise and pass over the obstruction, the spring P forcing the plow back to its place as soon as the obstruction has been passed.

When the machine is to be used as a cultivator the plow-standards S are arranged in two groups of three or more standards in each group, so that each group will cultivate the entire space between two rows of plants, and the machine will finish two rows at each passage across the field. In this case the central standard, S, of each group should be placed directly in the rear of a wheel, D, as shown in Fig. 1, so that the wheels D can be run in the centers of the spaces being cultivated.

When the machine is to be used as a harrow the row of plow-standards S can extend all the way across the machine.

When the machine is to be used for covering potatoes, pairs of standards S' are connected with the shaft O, the standards of each pair being connected by a cross-bar, S², and having plows T' attached to their lower ends and arranged to throw the soil inward, as indicated in Fig. 3.

Having thus described my invention, I claim as new and desire to secure by Letters Patent—

1. The combination, with the frame A and tongue B, of the wheel-standards swiveled to said frame, and provided with rigid arms E, the connecting-rods F, the foot-lever G, the rod J, and the hand-lever X, as and for the purpose described.

2. The combination, with the shaft O, having arms Q V, the lever X, and the connecting-rod W, of the coil-spring P on said shaft, the standards S, connected with the frame by adjustable chains V, and the rods R, as and for the purpose specified.

FRANCIS OSCAR WILLIAMS.

Witnesses:
CHAS. B. STODDARD,
KIRK WOODWORTH.